United States Patent [19]

Fremerey et al.

[11] Patent Number: 4,658,658
[45] Date of Patent: Apr. 21, 1987

[54] COIL SYSTEM FOR INDUCTIVE MEASUREMENT OF THE VELOCITY OF MOVEMENT OF A MAGNETIZED BODY

[75] Inventors: Johan K. Fremerey, Bonn; Bernd Lindenau, Jülich, both of Fed. Rep. of Germany

[73] Assignee: Kernforschungsanlage Jülich Gesellschaft mit beschränkter Haftung, Jülich, Fed. Rep. of Germany

[21] Appl. No.: 654,822

[22] Filed: Sep. 26, 1984

[30] Foreign Application Priority Data

Sep. 26, 1983 [DE] Fed. Rep. of Germany ....... 3334750

[51] Int. Cl.$^4$ .................... G01C 19/28; G01L 7/00; G01P 15/00
[52] U.S. Cl. .................... 74/5.6 E; 73/504; 73/505; 73/700
[58] Field of Search ............... 73/504, 505, 518, 700; 74/5.22, 5.6 E

[56] References Cited

U.S. PATENT DOCUMENTS

| | | | |
|---|---|---|---|
| 2,785,573 | 3/1957 | Bentley | 73/504 |
| 3,283,587 | 11/1966 | Hoffman | 73/504 |
| 3,470,399 | 9/1969 | Johnson et al. | 310/13 |
| 3,490,297 | 1/1970 | Brodersen | 73/504 |
| 3,540,293 | 11/1970 | Cochin | 73/504 X |
| 4,259,871 | 4/1981 | Kerhoas et al. | 74/5.6 E X |
| 4,395,914 | 8/1983 | Fremerey et al. | 73/700 |

FOREIGN PATENT DOCUMENTS

| | | | |
|---|---|---|---|
| 631812 | 8/1982 | Switzerland. | |
| 627363 | 8/1978 | U.S.S.R. | 73/700 |

OTHER PUBLICATIONS

Fremerey, J. K., *Spinning Rotor Vacuum Gauges*, Vaccum/vol. 32/No. 10/11, pp. 685 to 690/1982.

Comsa, George, et al., *Tangential Momentum Transfer in Spinning Rotor Molecular Gauges*, Proc. 7th Intern. Vac. Congr. & 3rd Intern. Conf. Solid Surfaces (Vienna 1977) pp. 157–160.

Fremerey, J. K., *High Vacuum Gas Friction Manometer*, The Journal of Vacuum Science and Technology, vol. 9, No. 1, pp. 108–111.

*Primary Examiner*—Rodney H. Bonck
*Attorney, Agent, or Firm*—Nils H. Ljungman

[57] ABSTRACT

A movement detection system for use in measuring movements of a rotating body or shaft which is magnetized along an axis which is angularly displaced from the mechanical axis of rotation thereof. The system has a plurality of inductive coils which are connected to produce signals proportional to the movements of the body or shaft while suppressing spurious noise signals.

17 Claims, 5 Drawing Figures

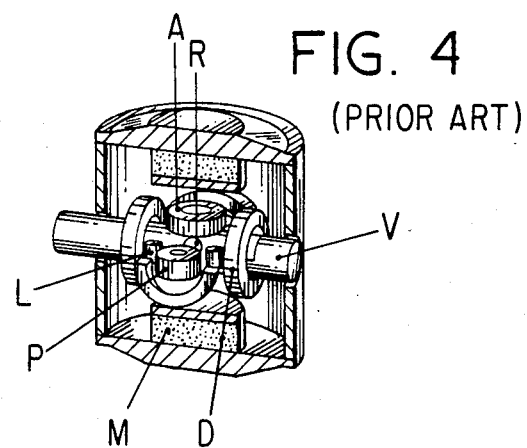
FIG. 4
(PRIOR ART)
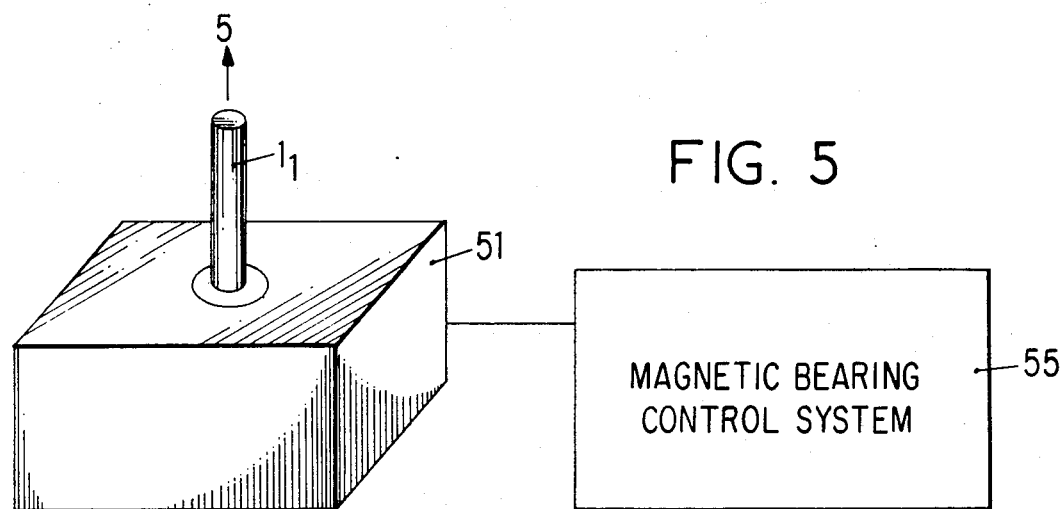
FIG. 5
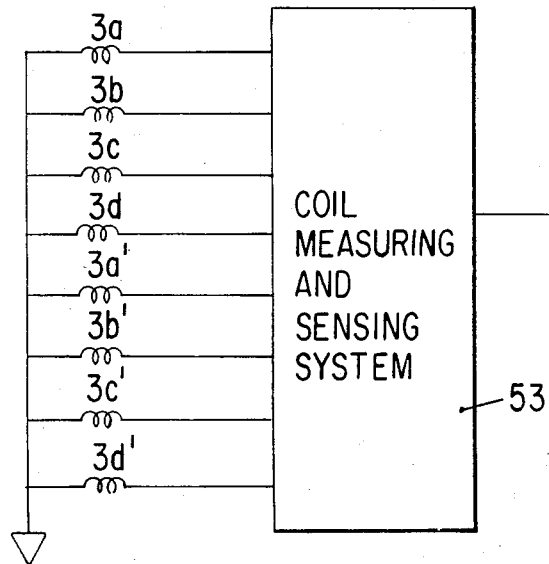

COIL SYSTEM FOR INDUCTIVE MEASUREMENT OF THE VELOCITY OF MOVEMENT OF A MAGNETIZED BODY

BACKGROUND OF THE INVENTION

1. FIELD OF THE INVENTION

The invention relates to a coil system for the inductive measurement of the velocity of movement of a body which is magnetized at least in one region. The magnetization generally produces an axis of magnetization which is oriented essentially parallel to a specified axis. The coil system comprises a plurality of electrical coils, which are spatially separated from one another in the vicinity of magnetized regions of the body and at some distance from the body. This coil system generates induced voltages proportional to the velocity of movement of the body which voltages are measured or sensed by appropriate electrical circuitry.

2. DESCRIPTION OF THE PRIOR ART

Coil or winding systems are used especially for the lateral stabilization of rotors with magnetic bearings in gas friction vacuum meters, as described in the *Journal of Vacuum Science and Technology*, Volume 9, page 108 (1972), (1); *Vacuum*, Volume 32, page 685, 1982, (2), and also for the measurement of the rotation frequency of such rotors, as described in References (1) and (2) and in *Proc. 7th International Vacuum Congress*, Vienna 1977, Volume 1, page 157, (3). These documents are incorporated herein by reference. The above-mentioned prior art rotors are magnetized essentially parallel to the axis of rotation. The use of coil systems, however, is not limited to the measurement of the movement velocity of rotating bodies. The measurement of velocities of translation movements of a magnetized non-rotating body is also known and have been shown in U.S. Pat. No. 3,470,399 entitled "Linear Motor Velocity Detection Apparatus" which is incorporated herein by reference. The concept "axis of rotation" or "axis of magnetization" are used only to determine a reference direction for the magnetization and location of the coil. Swiss Patent Publication No. 631,812 discloses a coil system for measuring the speed of a print element.

A disadvantage of the coil systems described in the above-mentioned publications (1) and (3) is that they respond not only to the movement of the rotor which is desired to be measured, but simultaneously to other movements thereof, whereby fundamentally interfering noise signals can be superimposed upon the desired measurement signal. In many cases, the installation of compensation coils is necessary to obtain a usable measurement signal. Thus, for example, for the measurement of lateral rotor movements along a movement coordinate perpendicular to the axis of rotation in the rotor with magnetic bearings described in (1), a total of four coils are provided, only two of which are used to compensate for the voltages induced by movements of a magnet located near the rotor. The spatial orientation and sizing of these compensation coils must be tuned very precisely to the specific location of the rotor and magnet, so that the required compensation is adequate. Such a coil combination, however, on account of its special tuning to the interfering magnet, is not capable of compensating for induced voltages which are caused by other sources of interference. For example, the compensation of alternating field induced voltages, such as those which customarily occur in the vicinity of electrically-driven vacuum pumps, makes at least one additional compensation coil necessary in the case described here. Even this coil system, which would then consist of five coils, would still be sensitive to movements of the magnetized rotor in the direction of the axis of rotation, and the rotation frequency of the rotor around the axis of rotation would also produce superimposed interference voltages, unless corresponding additional compensation coils were added, or other measures were taken to suppress the interfering signals. The difficulties described above in the configuration of a coil system which is resistant to interference refer only to the measurement of induced voltages by movements in a movement coordinate. A corresponding effort at compensation would have to be made with known coil systems for the measurement of each coordinate of movement.

OBJECT OF THE INVENTION

It is an object of the invention to provide a coil system which makes it possible with the use of a minimum of individual coils, to measure the velocity of movement of a body which may be rotational or even translational.

The body is at least partly magnetized or which leads magnetic flux so as to produce a pole pair, whereby the induced voltages corresponding to the various coordinates of movement can be obtained with a minimum of mutual superposition, and simultaneously with complete insensitivity to externally generated interference fields.

SUMMARY OF THE INVENTION

The prior art problem is solved by this invention, in that there are provided a plurality of coils, at least four coils, being shown in a preferred embodiment. In the vicinity of each of the two magnetic poles of the body, there are two coils each arranged symmetrical to the axis of rotation of the body, whereby the desired axis of rotation and the axis of the coils of the four coils lie in one plane, and run parallel to one another. With this arrangement of the coils, the velocity of movement, whether rotationally or translationally, of the body can be measured substantially entirely free of interfering influences.

The measurable movement coordinate is a function only of the interconnection of the coils. In coil systems, as described by the invention, the induced voltage corresponding to the coordinate of movement can always be obtained, while the induced voltages resulting from other directions of movement of the body can always be compensated.

In one embodiment of the invention, there is provision for all four coils to be connected in series or in a paralleling arrangement to add the induced voltages having the same polarity or phase. Such a circuit is advantageously suited for the measurement of the velocity of translation movements of the body parallel to the axis of rotation. If the coils on one side of the axis of rotation are connected with the same polarity, and the coils on the other side of the axis of rotation are connected with the opposite polarity, then the coil system is used primarily for measurement of translation movement velocities of the body perpendicular to the axis of rotation and parallel to the plane in which the magnetic axes of the coils lie. For the purpose of measuring the rotational movement velocities of the body around an axis perpendicular to the plane in which the coil axes lie, the coils are connected with alternating polarity or phase.

Another embodiment of the coil system features the coils connected with an electronic network with phase-inverter amplifiers and summing amplifiers so that electrical signals can be called up on separate outputs of the network, which are proportional to the velocities of movement of the body parallel to the axis of rotation, perpendicular to the axis of rotation and parallel to the above-mentioned plane, as well as around an axis of rotation perpendicular to this plane.

For the determination of the direction of rotation of the body, it is appropriate to include a second, similar coil system in a plane which intersects the axis of rotation in which the coil axes of the first coil system lie. This angle preferably equals 90°. However, other angular relationships can be used with the appropriate calculating circuitry to solve the geometrical equations of displacement and/or motion.

The coil system is advantageously suited for measuring the frequency of rotation of a body around the axis of rotation, specifically for measuring the rotation frequency of rotors in gas friction vacuum meters. In addition, precession and/or nutation movements can be measured on rotors which operate at high rotational frequencies.

BRIEF DESCRIPTION OF THE DRAWINGS

The invention will be explained in greater detail below with reference to examples, which are schematically illustrated in the drawings. The drawings show:

FIG. 4: A prior art permanent ferromagnetic suspension for a spinning rotor vacuum gauge;

FIG. 5: A magnetic bearing suspension system with a control system which is connected to the coil system of FIG. 3.

DESCRIPTION OF THE PREFERRED EMBODIMENTS

Figure 1:
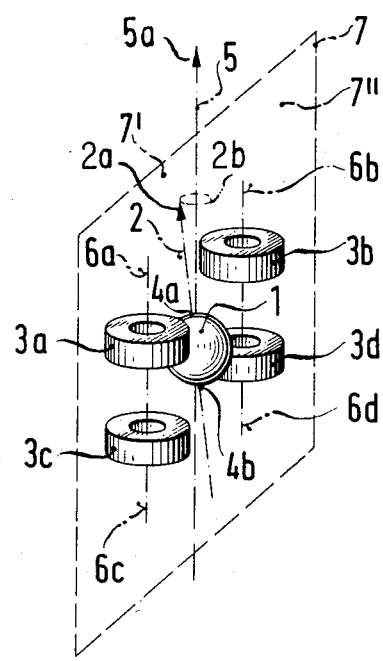
FIG. 1: A coil system with four coils in one plane.

FIG. 1 shows schematically a coil system which is used to measure the velocity of movement of a magnetized body 1. In the example, the body 1 is in the form of a steel ball which is supported by a magnetic bearing system to be shown infra, which ball is magnetized essentially parallel to a specified axis, the axis of magnetization 2. In the example illustrated in FIG. 1, the axis of magnetization 2 of the body 1 is only very slightly inclined in relation to the specified axis. In this embodiment, the axis of rotation 5 is shown by an arrow having a head 5a as the body 1 rotates about its axis of rotation 5, an arrow having a head 2a as and indicating the axis of magnetization 2, moves in a small circle 2b about the axis of rotation 5 of the body 1. A coil system disposed at some distance from the body 1 has four coils 3a, 3b, 3c and 3d, of which there are two coils each in the vicinity of the magnetic poles 4a, 4b formed by the magnetization of the body.

In FIG. 1 the magnets, which are necessary for the magnetic support of the body 1, are not shown. The coils 3a to 3d, do not produce magnetic fields which keep the ball or body 1 in its position as illustrated in FIG. 1.

The coils 3a to 3d are arranged in the vicinity of the magnetic poles 4a, 4b, so that the axis of rotation 5 and the coil axes 6a, 6b, 6c and 6d of coils 3a to 3d all lie in one plane 7, and all these axes run parallel to one another in this plane.

If the coils 3a to 3d are symmetrically placed about the rotating body and the magnetic field represented by the magnetic axis 2 is also assumed to be symmetrical about the body 1, the voltages induced in the coils 3a to 3b will be equal in amplitude but will have different phase relationships. If coils 3a and 3b are wound and connected identically, the phases thereof will be displaced from one another, as also will be the relationships of the voltages of the coils 3c and 3d. Since the magnetic flux density usually increases as the distance to the magnetic pole decreases, when the path or circle 2b generated by the magnetic pole 4a, for example, moves closer to the coil 3a, the peak amplitude or magnitude of the induced voltage therein increases while the corresponding voltage generated by the coil 3b decreases in magnitude.

In coils 3a to 3d, induced voltages generally proportional to the velocity of movement of the body are produced. The velocity of movement which can be measured at any time for a movement coordinate is a function of the circuitry of the coils. For a description of this mode of operation of the coil system, it will always be assumed in the following description that all four coils are substantially inductively identical and the turns thereof are arranged with the same winding direction. However, this is not a prerequisite for the desired mode of operation of the coil system since opposite winding directions and reversal of the connections will produce the same result. It is rather a question of the polarity or phase and amplitude of the induced voltages which are produced in the four coils, as will be described below.

When there is a translation movement of the body 1 in the direction of the axis of rotation 5, as shown by the arrow 5a, induced voltages of identical polarity or phase and amplitude are induced in the coils 3a and 3c. The coils 3a and 3c are disposed in the plane 7 to the left of the axis of rotation 5, designated as a side 7' in FIG. 1 of the plane 7. This is because the one magnetic pole, e.g., the magnetic north pole, moves toward one of these coils, while the other magnetic pole, e.g., the magnetic south pole, simultaneously moves away from the other coil. For reasons of symmetry, the same signals are induced in the coils 3b, 3d, which in FIG. 1 are to the right of the axis of rotation 5, on side 7" of the plane 7, as in the corresponding coils 3a, 3c on side 7'. Choices of winding sense, orientation and connection of the coils 3a through 3d are made in an appropriate manner in order for the polarity or phase and amplitude of the voltages induced in the coils to be generated as being described herein.

The polarity of the induced voltages produced by the movement of the body in the four coils can be represented by a series of mathematical signs corresponding to each coil 3a, 3b, 3c and 3d. Below, the polarization diagram for the coil system will always be indicated in the following sequence: coil 3a, coil 3b, coil 3c, coil 3d. For the case of the translation movement of the body 1 in the direction of the axis of rotation 5 as described in the preceding paragraph, the polarization diagram (+ + + +) then applies, or (− − − −), which means the same thing. Therefore, as a result of appropriate series or other connection of all four coils, an induced voltage can be obtained having characteristics which are proportional to the translation movement velocity of the rotor in the direction of a movement coordinate, which runs parallel to the axis of rotation 5.

If the magnetic body 1 in the coil arrangement illustrated in FIG. 1 makes lateral translation movements, i.e., so that the body moves perpendicular to the axis of rotation 5, the axis of rotation 5 is therefore displaced parallel, specifically when there is a parallel displacement of the axis of rotation 5 within the coil plane 7, then induced voltages with opposite polarity will be induced in the coils 3a and 3c on side 7'' of plane 7, because the poles 4a, 4b of the body 1, magnetized in the opposite direction, execute a movement which is in the same direction in relation to coils 3a and 3c. The same is true of the coils 3b and 3d on side 7'' of the plane 7. In the coils 3a and 3b lying on opposite sides of the axis of rotation 5 in the plane 7, voltages of opposite polarity are induced, because the magnetic pole 4a, in the vicinity of which they are located, moves toward the one coil and away from the other coil when there is a lateral translation movement of the body. The same is true for coils 3c and 3d, which are located in the vicinity of the magnetic pole 4b. In total, therefore, when there is a lateral translation movement of the body, there is a polarization diagram $(+ - - +)$ or $(- + + -)$. By means of appropriate series or other connection of the coil pairs 3a, 3d and 3b, 3c, and in phase or out of phase connection of the coil pairs 3a, 3b and 3d, 3c, a measurement voltage can be obtained which is proportional to the velocity of movement of the body in the plane 7 perpendicular to the axis of rotation 5.

If the body then executes rotational movements around a line normal to the plane 7, i.e., around an axis perpendicular to the plane 7, corresponding considerations give a third polarization diagram, namely the diagram $(+ - + -)$ or $(- + - +)$. With a circuitry of the four coils 3a to 3d corresponding to this polarization diagram, a measurement voltage can be obtained which is proportional to the angular velocity of the body around the above-mentioned line normal to the plane 7. This is true, however, only for small angular deviations of the axis of magnetization 2 from the axis of rotation 5, i.e., under the assumption that the magnetization of the body is oriented essentially parallel to the axis of rotation 5. When there are large angular deviations, there is no longer sufficient correspondence, as described by the invention, between magnetic poles and coils and the resulting polarity diagram.

The circuitry of the coil system described immediately above is particularly suited for measuring the frequency of rotation of a rotor around its axis of rotation. A prerequisite—as mentioned above—is that there is only a small angular deviation between the axis of rotation 5 and the axis of magnetization 2 of the rotor. Then the movement of the axis of magnetization 2 projected on the plane 7 has the same effect as a periodic rotational movement of the rotor with a small angular amplitude around a line normal to the plane 7. The measuring frequency is then equal to the frequency of rotation.

The polarization diagrams indicated show the required circuitries of the coil system described by the invention for the determination of the velocity of movement of the body in the direction of an assigned movement coordinate, i.e., so that when there is a corresponding connection, an induced voltage is obtained which is proportional to the velocity of movement in one of the movement coordinates. There is always compensation for the induced voltages resulting from other movement directions, which do not correspond to the measured movement coordinates.

If we consider the influence of external interference fields, then we come to the following conclusion: Interference fields which run perpendicular to the axis of rotation 5 do not produce any induced voltages in the coils, because all the coil axes run perpendicular to the interference field; external interference fields which run parallel to the axis of rotation or to the coil axes only cause interference in the case of the polarization diagram $(+ + + +)$ or $(- - - -)$. With all other polarity diagrams, the induced voltages produced by the interference fields cancel one another out.

A measurement of translation movements in the direction of the axis of rotation 5 which is insensitive to external interference fields can be achieved by an arrangement in which the coil pairs 3a, 3b and 3c, 3d are located in the vicinity of like magnetic poles 4a, 4b. The corresponding polarization diagram in this case is $(+ + - -)$ or $(- - + +)$. As a result of the mixed polarities of the individual coils, there is again the compensation of induced voltages which are caused by the external interference fields. For the other movement coordinates mentioned above, with like magnetic poles the assignment of polarization diagram and direction of movement is reversed, i.e., when there is a lateral translation movement, the polarization diagram is $(+ - + -)$ or $(- + - +)$, and for rotational movements of the body, the polarization diagram is $(+ - - +)$ or $(- + + -)$.

Figure 2:
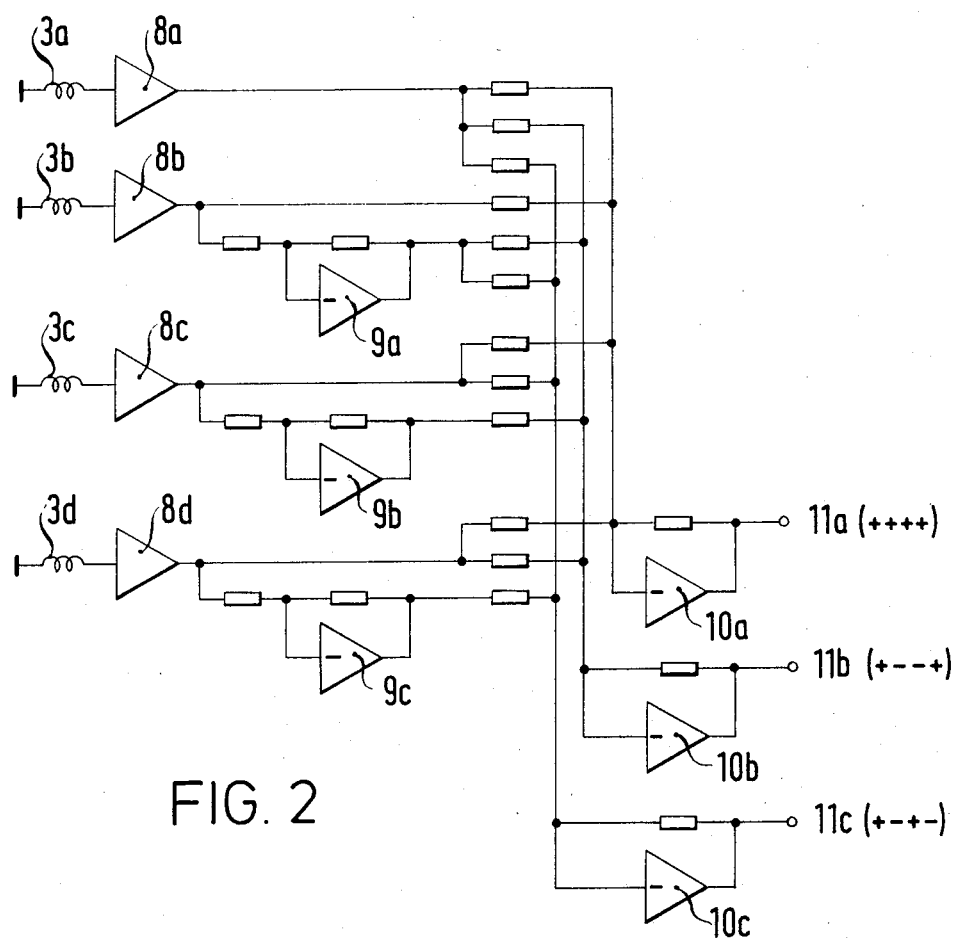
FIG. 2: An electronic network for the coil system as illustrated in FIG. 1.

Although in many cases, the measurement of only one movement coordinate is necessary, for example in the case of the measurement of the speed of rotation of rotors in gas friction vacuum meters, it seems logical to use a coil system of the type described by the invention for the measurement of the velocity of movement in different movement coordinates. For this purpose, an electronic network as illustrated in FIG. 2 can be used. In this network, the induced voltages obtained in the coils 3a to 3d are first pre-amplified by means of the amplifiers 8a to 8d. Then, by means of the phase-inverter amplifiers 9a, 9b, 9c, voltages of the opposite polarity are obtained.

Finally, by means of the summing amplifiers 10a, 10b and 10c, three compound output voltages are produced, which correspond to the polarization diagrams described above. At outputs 11a, 11b and 11c of the network, therefore, measurement voltages are available for the translation movement of the body parallel to its axis of rotation, output 11a (polarization diagram $(+ + + +)$ or $(- - - -)$), also for the translation movement in the plane 7 perpendicular to the axis of rotation, output 11b (polarization diagram $(+ - - +)$ or $(- + + -)$), and finally for small angular movements around a line normal to the plane 7, output 11c (polarization diagram $(+ - + -)$ or $(- + - +)$). The signals measured at the output 11c can be used for a determination of the rotation frequency, as long as the axis of magnetization 2 exhibits only a small angular deviation in relation to the axis of rotation 5 of the body.

Figure 3:
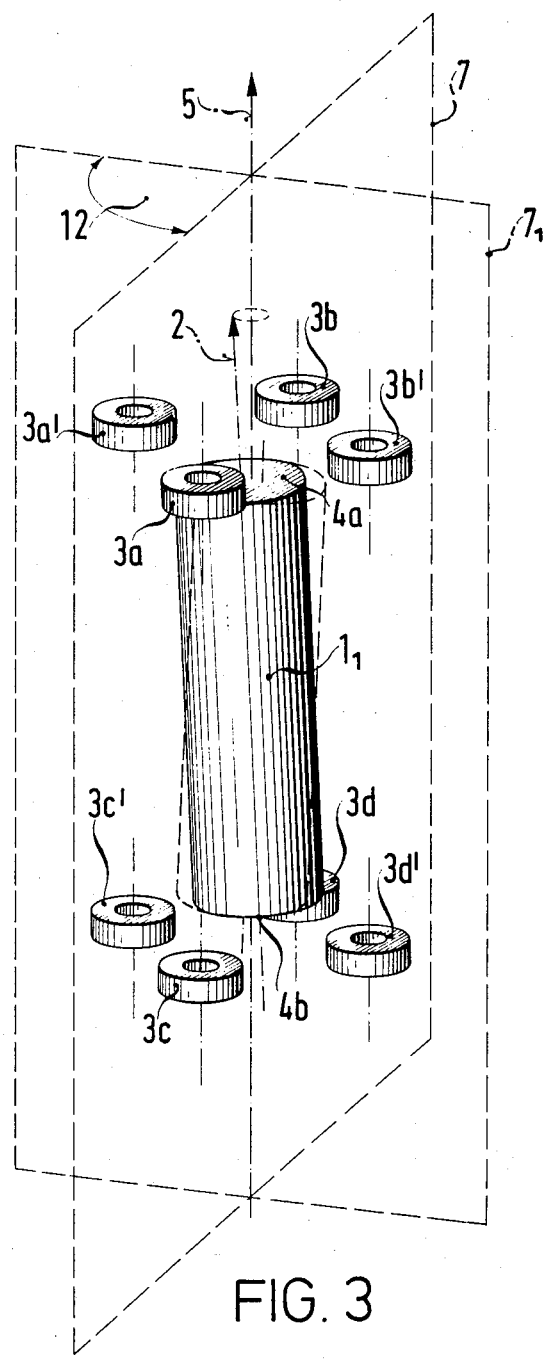
FIG. 3: A coil system with eight coils in two planes.

Two coil systems with two planes 7 and $7_1$, which planes intersect at an angle 12 of 90°, at the axis of rotation 5 of a cylindrical body $1_1$ in the example are illustrated in FIG. 3. With such a coil system, the movement of the cylindrical body $1_1$ can be measured in all six movement coordinates. In the example illustrated in FIG. 3, the two systems of four coils each are disposed in planes. One of these systems of four coils is disposed in a plane $7_1$, and another system of four coils is disposed in a plane 7. Two coils of each system are disposed in the vicinity of each magnetic pole. 4a, 4b of the cylindrical body $1_1$. An additional set of four coils 3a', 3b', 3c' and 3d' are disposed in the plane $7_1$, substantially similarly to the coils 3a through 3d as disposed in the plane 7. Such a coil system is particularly suited for determining the direction of rotation of the rotating body, since the rotating axis of magnetization 2 in the coil system causes a phase shift of the induced voltages produced, which corresponds to the direction of rotation. This is of importance for the recognition and preparation of signals which are produced by precession and nutation movements of rotors with a high rotation frequency. Measurement signals of this type can be used in connection with electronic drive elements to damp such movements as shown in FIG. 5.

FIG. 4 illustrates a permanent ferromagnetic suspension spinning rotor vacuum gauge according to the prior art having a rotor R, permanent magnets M, vacuum enclosure V, pick-up coils A for pick-up of axial rotor position and for control thereof, coils L for damping, drive coils D and pick-up coils P.

FIG. 5 illustrates a magnetic bearing suspension system 51 according to and well-known in the prior art, with the present measuring system 53 having coils 3a, 3b, 3c, 3d, 3a', 3b', 3c' and 3d' connected thereto. A prior art control system 55 is connected between the measuring system 53 and the magnetic bearing suspension system 51 such that the voltages induced in the coils 3a–3d control the position of the cylindrical body $1_1$. The shaft 5 and the suspension system 51 may be horizontal as well as vertical as shown.

Alternatively, a phase sensitive detector or demodulator, well-known in the art, using one of the induced coil voltages, such as, from coil 3a may be used as a reference for detecting or demodulating the phase and amplitude of the other coil voltages with relation to the reference and then sensing or measuring the rovement of the body 1 or $1_1$.

It is within the scope of the invention to include the structure wherein the body 1 is externally magnetized such as by a magnetic field external thereto and also where the body 1 or $1_1$ comprises a non-homogeneously ferromagnetic, paramagnetic or diamagnetic material and/or a partially non-magnetic material.

The invention is not to be taken as limited to all the details that are described hereinabove, since modifications and variations thereof may be made without departing from the spirit or scope of the invention.

What is claimed is:

1. A coil system for inductively sensing a movement of a body, said system comprising:
   structure means for supporting said body, said body having magnetization means associated therewith for directing magnetic flux from at least one pole pair,
   said body having at least one predetermined location of operation and a predetermined axis of mechanical rotation, said body, in operation, rotating about said rotational axis;
   said at least one pole pair defining at least one magnetic axis, said at least one magnetic axis in operation having at least one angular component being angularly displaced from said axis of rotation;
   at least four inductively wound coils also being disposed in said structure means and being displaced from said body, said at least four coils also disposed for being inductively linked in operation to said flux of said magnetization means of said body;
   said at least four coils each defining a magnetic axis, each said magnetic axis being disposed substantially parallel to said axis of mechanical rotation of said body;
   each said magnetic axis of said at least four coils substantially defining one plane and lying therein; and
   means for electrically connecting said at least four coils to produce at least one signal indicative of a mechanical displacement of said body from said at least one predetermined position while said body is in operation.

2. The coil system for inductively sensing a movement of a body according to claim 1 wherein a first set of two of said at least four coils disposed on one side of said axis of rotation and a second set of two of said at least four coils disposed on another side of said axis of rotation opposite said first set.

3. The coil system for inductively sensing a movement of a body according to claim 2 wherein said coils are disposed to generate, in operation, induced voltages which are proportional to the rate of speed of movement of said body with relation to said coils.

4. The coil system for inductively sensing a movement of a body according to claim 3 wherein said coils lying in a plane on one side of the axis of rotation are connected in opposition, and the coils opposite in relation to the axis of rotation are also connected in opposition.

5. The coil system for inductively sensing a movement of a body according to claim 2 wherein said coils of said first set are connected in an aiding relationship, and wherein said coils of said second set, opposite said first pair in relation to the axis of rotation, are connected in an opposing relationship.

6. The coil system for inductively sensing a movement of a body according to claim 5 wherein said connecting means include an electronic circuit with phase inverter amplifiers and summing amplifiers connected to said coils.

7. The coil system for inductively sensing a movement of a body according to claim 5 including an other coil system disposed outside of said plane of said four coils and is connected to said electrical connecting means.

8. The coil system for inductively sensing a movement of a body according to claim 7 wherein said other coil system is located in a plane which intersects said plane of said four coils on the axis of rotation at an angle other than zero degrees.

9. The coil system for inductively sensing a movement of a body according to claim 8 wherein said body comprises a high speed shaft and said electrical connecting means includes means for measuring precession or nutation movements of said shaft.

10. The coil system for inductively sensing a movement of a body according to claim 8 wherein said electrical connecting means includes means for measuring a rotational frequency of said body about said axis of rotation.

11. The coil system for inductively sensing a movement of a body according to claim 10 wherein said structure means comprises a gas friction vacuum meter and said body is a rotor of said meter and said frequency measuring means includes means for measuring the rotational frequency of said rotor.

12. The coil system for inductively sensing a movement of a body according to claim 2 wherein said coils lying in a plane on one side of the axis of rotation are connected in opposition, and the coils opposite said first set in relation to the axis of rotation are also connected in opposition.

13. The coil system for inductively sensing a movement of a body according to claim 12 wherein said connecting means include an electronic circuit with phase inverter amplifiers and summing amplifiers connected to said coils.

14. The coil system for inductively sensing a movement of a body according to claim 1 wherein said at least four coils are connected to said electrical connecting means to add and reinforce the voltages induced in said at least four coils.

15. The coil system for inductively sensing a movement of a body according to claim 14 wherein said connecting means include an electronic circuit with phase inverter amplifiers and summing amplifiers connected to said coils.

16. A coil system for inductively measuring a mechanical rate of speed of a movement and a mechanical rotational velocity of a body, said coil system comprising:

structure means for supporting said body, said body having magnetization means associated therewith for directing magnetic flux from at least one pole pair, said body having at least one predetermined location of operation and also a predetermined axis of mechanical rotation, said body, in operation, rotating about said axis; said body having degrees of freedom about said predetermined axis of mechanical rotation, a first and a second translational axis perpendicular to said longitudinal axis and a first and a second rotational axis both perpendicular to said longitudinal axis;

said at least one pole pair defining at least one magnetic axis, said at least one magnetic axis in operation having at least one angular component being angularly displaced from said axis of rotation;

eight inductively wound coils also being disposed in said structure means and being displaced from said body, said at least eight coils also disposed for being inductively linked in operation to said flux of said magnetization means of said body;

said eight coils each defining a magnetic axis, each said magnetic axis being disposed substantially parallel to said axis of mechanical rotation of said body;

said eight coils comprising a first and a second set of four coils each, the magnetic axes of said first set of coils defining a first plane and lying therein, the magnetic axes of said second set of coils defining a second plane and lying therein; and means for electrically connecting said eight coils to produce signals indicative of a mechanical displacement of said body in rotational operation along said first and second translational, said longitudinal and said first and second rotational axes and an angular frequency of said body.

17. A coil system for inductively sensing a movement of a body, said system comprising:

structure means for supporting said body, said body having magnetization means associated therewith for directing magnetic flux from at least one pole pair, said body having at least one predetermined region of operation and a predetermined axis of mechanical translation, said body, in operation, traveling along said translational axis;

said body having an axis of mechanical rotation;

said at least one pole pair defining at least one magnetic axis, said at least one magnetic axis in operation having at least one angular component being angularly displaced from said axis of translation;

at least four inductively wound coils also being disposed in said structure means and being displaced from said body, said at least four coils also disposed for being inductively linked in operation to said flux of said magnetization means of said body;

said at least four coils each defining a magnetic axis, each said magnetic axis being disposed substantially parallel to said axis of mechanical rotation of said body;

said at least four coils comprising pairs;

the magnetic axes of a first of said pairs of coils being disposed colinearly and the magnetic axes of a second of said pairs of coils being disposed colinearly;

said magnetic axis of said first pair and said second pair of coils substantially defining a plane and lying therein;

said axis of mechanical translation also lying substantially in said plane; and means for electrically connecting said at least four coils to produce at least one signal indicative of a mechanical displacement of said body from said at least one predetermined region of operation.

* * * * *